United States Patent [19]

Ammann

[11] Patent Number: 5,319,187
[45] Date of Patent: Jun. 7, 1994

[54] LASER BEAM RECEIVERS AND CANAL BUILDING LASER DEVICES

[75] Inventor: Hans-Rudolf Ammann, Amriswil, Switzerland

[73] Assignee: Ammann Lasertechnik AG, Amriswil, Switzerland

[21] Appl. No.: 88,058

[22] Filed: Jul. 2, 1993

[30] Foreign Application Priority Data

Jul. 3, 1992 [CH] Switzerland ............... 02 108/92

[51] Int. Cl.$^5$ .......................................... G01J 1/20
[52] U.S. Cl. ............................ 250/203.3; 356/400
[58] Field of Search ........... 250/203.3, 203.2, 201.1, 250/578.1; 356/400, 401, 141, 152; 385/123

[56] References Cited

U.S. PATENT DOCUMENTS 3,511,998  5/1970  Smokler ...................... 250/203.3
3,535,525  10/1970  Minkowitz ................. 250/203.3

*Primary Examiner*—David C. Nelms
*Assistant Examiner*—Que T. Le
*Attorney, Agent, or Firm*—Nies, Kurz, Bergert & Tamburro

[57] ABSTRACT

An arrangement comprising a laser beam receiver and a canal building laser device is intended to be disposed in a pipeline. The canal building laser device is located in a shaft at the beginning of the pipeline and the laser beam receiver is located at the end of the portion of the pipeline produced, for example, the previous day, in the region of a still open pit. Owing to the distance from the laser beam receiver and the unevenness of the pipe, it should be assumed, even with careful locating of the canal building laser device, that a laser beam from the laser device does not impinge exactly on the laser beam receiver. The laser beam receiver has an infrared light source for transmitting a control signal to an infrared light receiver on the canal building laser device. The angle of emergence of the laser beam emitted by the canal building laser may be remotely controlled via control buttons on the laser beam receiver. The laser beam may therefore conveniently be centred onto the longitudinal axis of the pipeline. If the laser beam is located in the region of detection of the target field of the laser beam receiver it may even be orientated automatically.

10 Claims, 3 Drawing Sheets

LASER BEAM RECEIVERS AND CANAL BUILDING LASER DEVICES

FIELD OF THE INVENTION

This invention relates to an arrangement consisting of a laser beam receiver and a canal building laser device, wherein the laser beam receiver is intended to receive the laser beam issuing from the canal building laser device.

BACKGROUND OF THE INVENTION

Known laser beam levelling devices serve to determine a horizontal or an inclined plane and are used for building purposes. The laser beam issuing from the device is received at a relatively great distance by a receiver. The inclination of the imaginary plane between the laser beam device and the receiver may therefore be measured. Laser beam levelling devices are used, for example, in ground excavation and the grading of pits, in the monitoring of concrete foundations and concrete ceilings, orientation of formwork, in the levelling of tracks for building cranes and many more.

Canal building laser devices are a subgenus of laser beam levelling devices. They are used in the construction of pipelines, for example of drainage pipes, in order to lay the individual lengths of pipe in the desired inclination and direction. The lengths of pipe are lined up until they form a pipeline with an inclination of, for example, 1.2%. Shafts are installed at intervals; there is no change of direction between the shafts. The inclination of the individual portions of pipeline between the shafts has to differ in each case in practice.

During the construction of a pipeline, the canal building laser device is erected at the beginning of a line, i.e. normally in the region of a shaft, such that the laser beam points in the desired direction and has the desired inclination. The laser beam therefore indicates both the direction and the inclination in which the pipeline is to be constructed. The receiver is inserted at the opposite end of the length of pipe to be positioned. The receiver usually has a transparent disc with markings in the form of a reticule. The laser beam issuing from the canal building laser device strikes the disc of the receiver as a spot of light. As soon as this spot of light is located in the centre of the reticule, the length of pipe is correctly positioned and may be fastened in this position.

The inventor has disclosed a laser beam receiver for canal building laser devices which has photocells arranged in the form of a cross on the side which is to face the laser beam. These photocells are opposed by light-emitting diodes on the opposite side of the receiver. The advantage of this receiver is that the laser beam may be received at a distance of up to 300 m and may easily be read off owing to the light-emitting diodes.

If work on a pipeline is shut down in the evening, the expensive laser beam devices have to be removed and stored safely. The devices have to be erected again on the following day before building work can continue. Although a canal building laser device is designed such that it may readily be orientated with respect to the longitudinal axis of the pipe during erection, it will be difficult to locate it as on the previous day to the nearest millimeter. A canal building laser device is usually provided with a spirit level which is visible from the exterior and allows the device to be erected in the pipe cross section such that it is almost orientated with respect to the longitudinal axis of the pipe. However, even the slightest deviation inevitably causes the laser beam arriving in the region of the receiver at a distance of, for example, 50 to 100 m to be located clearly next to the longitudinal axis of the pipe. As the concrete pipes normally used for producing water or drainage pipes also have a relatively rough and uneven surface, it is almost impossible to position the canal building laser device such that the laser beam issuing at the inclination and azimuth angle values input the previous day is located exactly in the longitudinal axis of the finished portion of pipeline. For this reason it is necessary to input again at least the azimuth angle or to shift the device until the direction of the laser beam matches. A drawback of this arrangement is that two people are required for this work: one who takes the receiver to the end of the pipeline and observes where the laser beam impinging as a spot of light is located and another person who remains at the canal building laser device and operates it. Problems of communication may also arise owing to the often great distance between the canal building laser device and the receiver, so radio equipment may also be required.

SUMMARY OF THE INVENTION

The object of the present invention is to provide an arrangement consisting of a laser beam receiver and a canal building laser device with which the orientation of the laser beam, in particular during re-erection of the canal building laser device after an interruption in work, is simpler and may be carried out by a single person.

According to the invention, there is provided an arrangement consisting of a laser beam receiver and a canal building laser device, said laser device being adapted to emit a laser beam and said laser beam receiver being intended to receive the laser beam emitted by the canal building laser device, in which the laser beam receiver has means for transmitting a control signal and the canal building laser device has means for receiving said control signal and in which the canal building laser device further has a controller connected to at least one adjusting arrangement for adjusting the angle at which the laser beam is emitted which is arranged in the canal building laser device, the arrangement being such that the control signal arriving from the laser beam receiver can be transposed into an adjustment of the angle at which the laser beam is emitted by the canal building laser device.

Owing to this arrangement, the orientation of the laser beam emitted by a canal building laser device with respect to the longitudinal axis of a finished portion of pipeline is considerably simpler. Work may be carried out by a single person who has to erect the canal building laser device in roughly the correct position at the beginning of the pipeline, then has to go to the end of the pipeline with the laser beam receiver and can bring about the final orientation of the laser beam from there without difficulty. This orientation takes place all the more rapidly as the person operating the devices can always see the point of impingement of the laser beam himself and is not instructed by misleading shouts or radio conversations with an assistant who is usually unskilled.

BRIEF DESCRIPTION OF THE DRAWINGS

The invention will now be described in detail, by way of example, with reference to the drawings, in which.

DESCRIPTION OF PREFERRED EMBODIMENT

Figure 1:
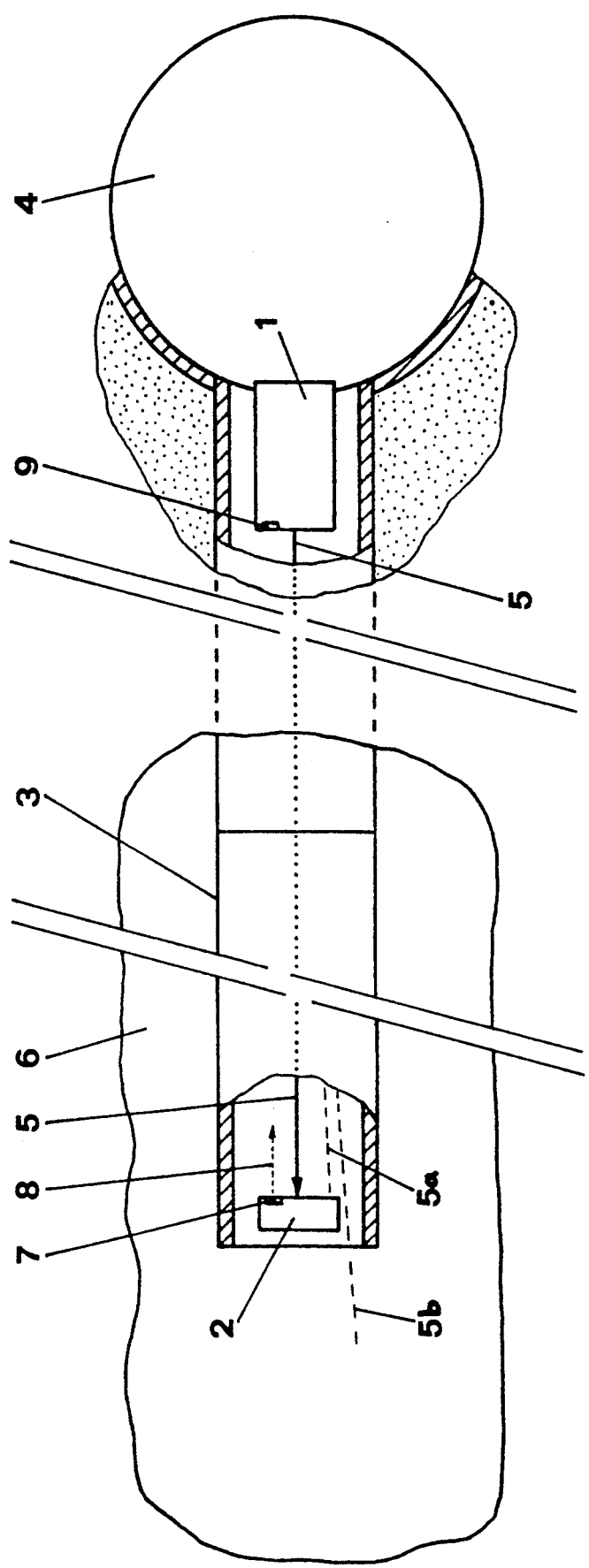
FIG. 1 shows schematically the disposition of an arrangement according to the invention in a pipeline.

Referring to the drawings, an arrangement according to the invention and consisting of a canal building laser device 1 and a laser beam receiver 2 is arranged in a pipeline 3, as shown in FIG 1. The canal building laser device 1 is erected in the pipe in the region of a shaft 4 at the beginning of this portion of the pipeline 3 such that a laser beam 5 emitted in the direction of the laser beam receiver 2 extends approximately along the longitudinal axis of the pipeline 3. The laser beam receiver 2 is arranged in the pipe cross section at the end of the portion of the pipeline 3 finished the previous day, for example. A pit 6 is still open in this region. Owing to the usually great distance between the canal building laser device 1 and the laser beam receiver 2, the laser beam 5 will not impinge exactly on the laser beam receiver 2 even with careful locating of the canal building laser device 1. As indicated, for example by 5a, the laser beam 5 may impinge on the edge of the laser beam receiver 2 which does not react to it or may even run past it, as indicated by 5b.

According to the invention, the laser beam receiver 2 is equipped with a remote controller for the canal building laser device 1. Canal building laser devices are provided with mechanical adjusting arrangements with which the direction, i.e. the inclination and the azimuth angle of the laser beam, may be adjusted. These adjusting arrangements operate with a respective electric motor which is actuated via a control keyboard located externally on the canal building laser device.

The adjusting arrangement for the azimuth angle is now actuated via the remote control of the laser beam receiver 2 rather than via the control keyboard of the canal building laser device 1. For this purpose, the laser beam receiver 2 is provided, for example, with an infrared light source 7 which emits infrared light signals 8 to a corresponding infrared light receiver 9 on the canal building laser device 1.

Figure 2:
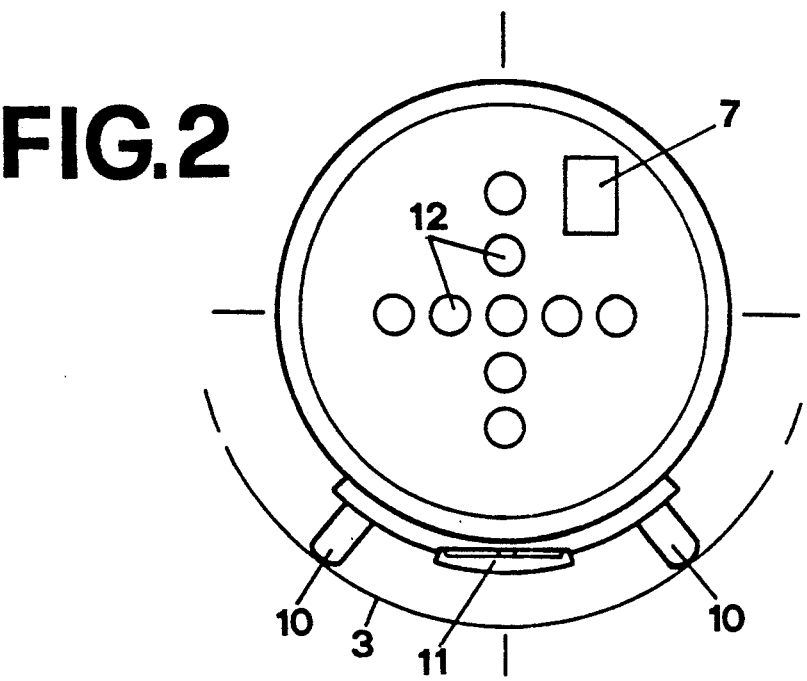
FIG. 2 shows the side of the laser beam receiver which is to face the laser beam.
Figure 3:
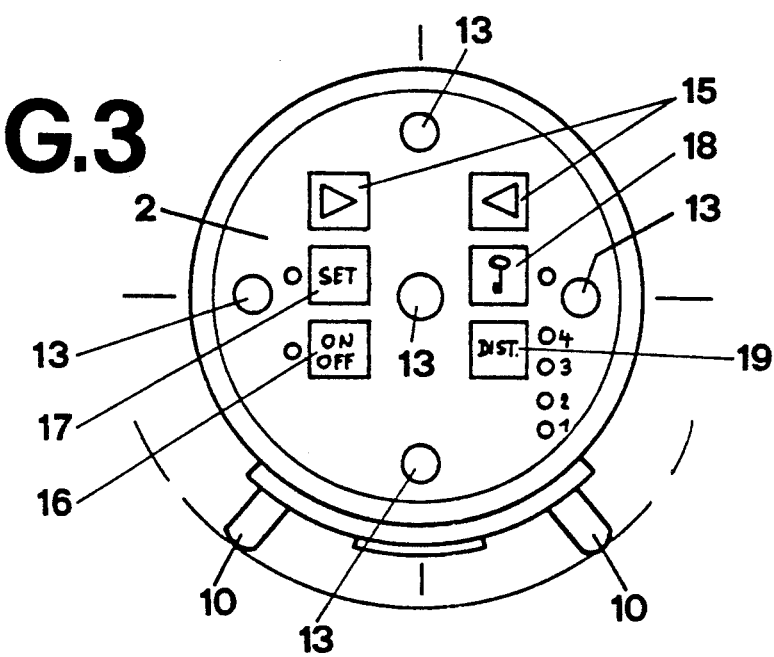
FIG. 3 shows the side of the laser beam receiver which is to be turned away from the laser beam.
Figure 4:
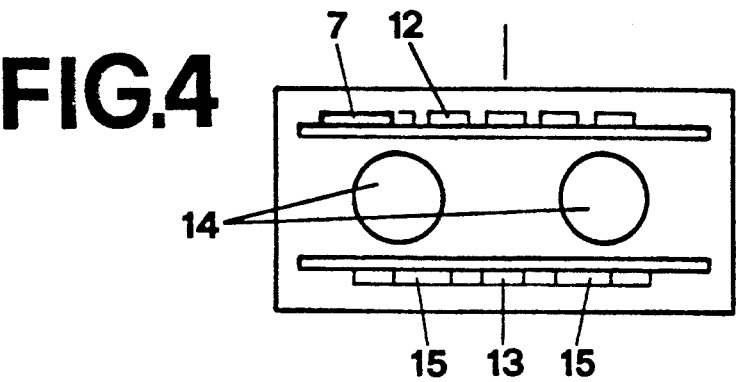
FIG. 4 shows schematically a plan view of the laser beam receiver.

The laser beam receiver 2 will now be described with reference to FIGS. 2 to 4. FIG. 2 shows the side of the laser beam receiver 2 turned toward the laser beam arriving from the canal building laser device 1 and FIG. 3 shows the side of the laser beam receiver 2 turned away from the laser beam. FIG. 4 shows a plan view of the laser beam receiver 2. As indicated, the laser beam receiver 2 is to be arranged in the pipeline 3. For this purpose the laser beam receiver 2 is provided with feet 10 and a spirit level 11.

On the side which is to face the laser beam 1 (FIG. 2), the laser beam receiver has photocells 12 which are arranged in the form of a cross. Further photocells may additionally be provided to cover the free space between the beams of the cross. However, the photocells could also be arranged in concentric rings. These photocells 12 are opposed by light-emitting diodes 13 which are also arranged in the form of a cross on the opposite side of the laser beam receiver (FIG. 3). The photocells 12 and the light-emitting diodes 13 are electrically connected to one another.

The infrared light source 7 can also be seen on the side of the laser beam receiver 2 which is to face the laser beam (FIG. 2).

The power is supplied by batteries 14 arranged between the carrier elements of the photocells and light-emitting diodes in the cylindrical casing of the laser beam receiver 2 (FIG. 4).

Control buttons are arranged on the side of the laser beam receiver 2 which is to face the operator, i.e. is to be turned away from the laser beam. In particular, two buttons 15 are provided by means of which the laser beam may be moved either to the left or to the right toward the centre of the laser beam receiver 2. As soon as the laser beam is located in the centre of the laser beam receiver, i.e. exactly in the longitudinal axis of the pipeline, the central light-emitting diode 13 lights up. A button 16 for switching the laser beam receiver 2 on and off as well as buttons 17 and 18 for initiating the correction of direction or for locking the keyboard are also provided on this side of the laser beam receiver 2. This prevents displacement of the laser beam being initiated unintentionally by chance contact with the buttons 15 and 17 during the positioning of the laser beam receiver 2. Finally, a further button 19 is provided for adjusting the approximate distance between the canal building laser device 1 and the laser beam receiver 2. This may be necessary because the diameter of the laser beam impinging as a spot of light increases as the distance increases and the need therefore arises for the laser beam receiver to react differently to it. Four different distances may be adjusted in the present example.

Figure 5:
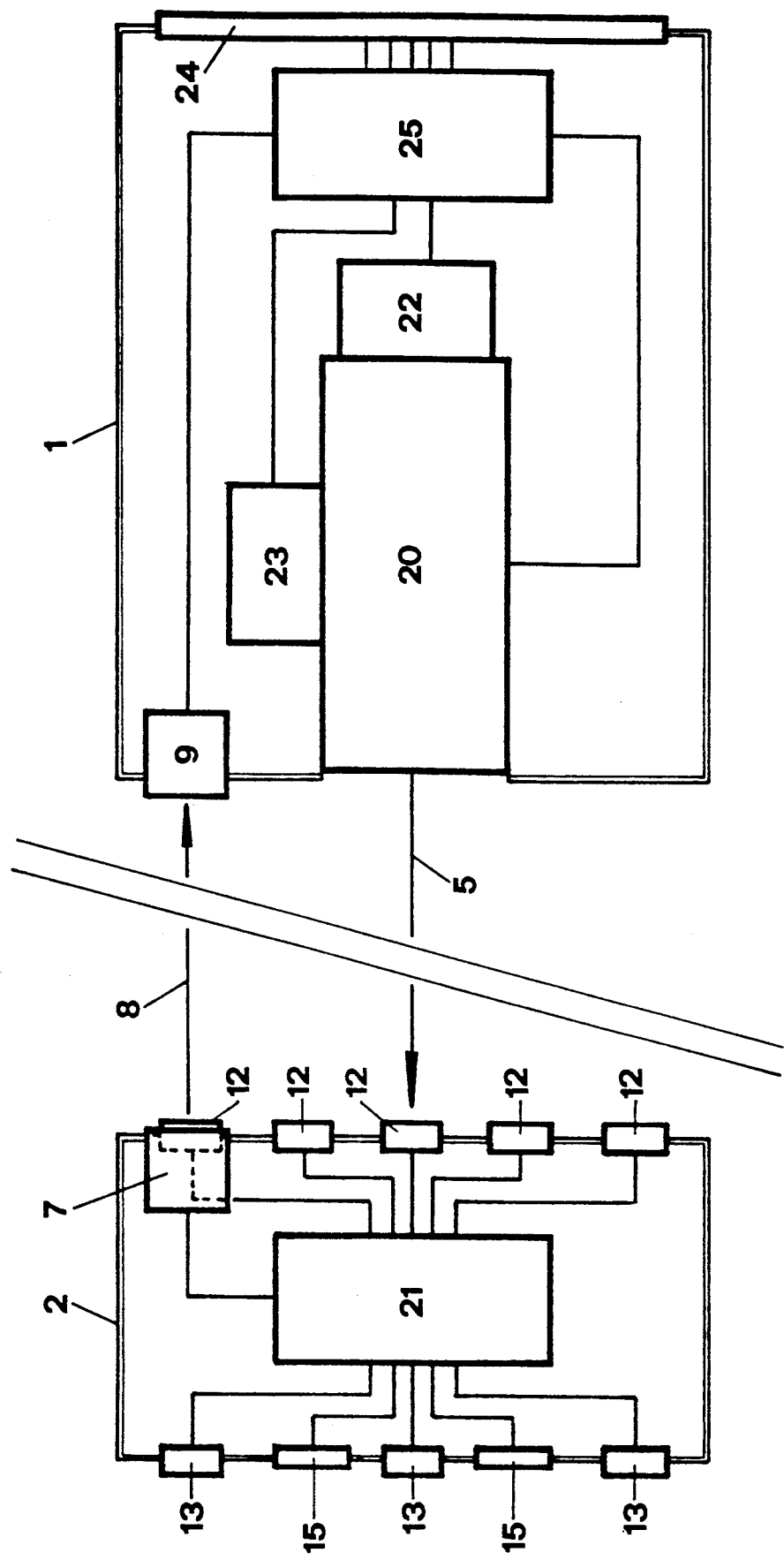
FIG. 5 shows the construction of the arrangement in a simplified diagram.

The construction of the canal building laser device 1 and of the laser beam receiver 2 may be seen with reference to the simplified diagram in FIG. 5. The laser beam 5 is transmitted from a laser light source 20 in the direction of the laser beam receiver 2 where it impinges on a photocell 12 which is again displayed at a light-emitting diode 13.

The above-mentioned infrared light source 7 and the buttons 15 are also arranged in the laser beam receiver 2. The individual components are connected to a controller 21.

In the canal building laser device 1 there are arranged, in a known manner, adjusting arrangements 22 and 23 with which the azimuth angle and the inclination of the laser beam 5 may be adjusted so that the laser light source 20 is accordingly displaced. A control keyboard 24 and also a controller 25 are additionally provided.

If the operator notices that the laser beam 5 impinges outside the receiving area of the laser beam receiver 2, as indicated for example by 5b in FIG. 1, the laser beam 5 is moved in the necessary direction by actuation of the appropriate button 15. This command is given via the controller 21 to the infrared light source 7 which emits the appropriate infrared light signal 8. This signal is received by the infrared light receiver 9 of the canal building laser device 1 and is conveyed to the controller 25. The controller 25 now causes the adjusting arrangement 22 to change the azimuth angle of the laser light source 20 and therefore of the laser beam 5 in the desired direction.

The arrangement consisting of the canal building laser device 1 and the laser beam receiving device 2 is advantageously designed such that the controllers 21 and 25 are capable of automatically orientating the laser beam 5 with respect to the centre of the laser beam receiver 2 as soon as the laser beam 5 is located such that it is received by the laser beam receiver 2.

Therefore, when the spot of light of the arriving laser beam 5 is located outside the receiving area of the laser beam receiver 2, i.e. is visible for example on the internal wall of the pipeline or on the clothing, the operator merely has to press the appropriate direction button 15. The laser beam 5 is now moved toward the laser beam receiver 2. As soon as the laser beam receiver 2 receives the laser beam 5, the laser beam 5 is automatically centred on the longitudinal axis of the pipeline without further activity by the operator.

On the other hand, if the laser beam 5 is located within the receiving area of the laser beam receiver but not in the centre as desired, automatic centring may be triggered by pressing the button 17.

These automatic functions are only possible if the remote control function is installed in the laser beam receiver and the laser beam receiver has means for detecting the position of the laser beam.

Deviating from the present embodiment, it is also conceivable also to adjust the inclination, i.e. the angle of elevation, of the laser beam in addition to the azimuth angle using the laser beam receiver 2. Other suitable means could be provided for transmitting the control signal instead of the infrared light source and the infrared light receiver.

It should also be noted that the invention is not restricted to the above-described embodiment but modifications and variations may be made without departing from the spirit and scope of the invention as defined by the appended claims.

I claim:

1. An arrangement consisting of a laser beam receiver and a canal building laser device, said laser device being adapted to emit a laser beam and said laser beam receiver being intended to receive the laser beam emitted by the canal building laser device, in which the laser beam receiver has means for transmitting a control signal and the canal building laser device has means for receiving said control signal and in which the canal building laser device further has a controller connected to at least one adjusting arrangement for adjusting the angle at which the laser beam is emitted which is arranged in the canal building laser device, the arrangement being such that the control signal arriving from the laser beam receiver can be transposed into an adjustment of the angle at which the laser beam is emitted by the canal building laser device.

2. An arrangement as claimed in claim 1, in which the means for transmitting the control signal in the laser beam receiver comprise an infrared light source and the means for receiving the control signal in the canal building laser device comprise an infrared light receiver.

3. An arrangement as claimed in claim 1, in which the laser beam receiver has at least one button for inputting a control command which triggers the control signal for the canal building laser device.

4. An arrangement as claimed in claim 1, in which a target field is arranged on the side of the laser beam receiver which is to face the laser beam, said target field having means for determining the position of the light spot formed by the laser beam on the target field.

5. An arrangement as claimed in claim 4, in which means are provided on the side of the laser beam receiver to be turned away from the laser beam for displaying the position of the laser beam light spot on the target field.

6. An arrangement as claimed in claim 5, in which said displaying means comprise light-emitting diodes.

7. An arrangement as claimed in claim 4, in which the laser beam receiver has a controller which is designed such that it is capable automatically of orientating the laser beam with respect to the centre of the target field of the laser beam receiver as soon as the laser beam is located such that it is detected by the means for determining the position of the light spot formed by the laser beam, said controller allowing the corresponding control signals to be transmitted to the canal building laser device until said light spot is located on the determining means at the centre of the target field on the laser beam receiver.

8. An arrangement as claimed in claim 7, in which a further button is provided for triggering the automatic centring of the laser beam if the laser beam is located in the receiving area of the laser beam receiver but not at its centre.

9. An arrangement as claimed in claim 3, in which, in addition to the button for inputting the control command which triggers the control signal for the canal building laser device, at least one further button is provided which has to be pressed in order to initiate the desired correction of direction of the laser beam, said additional button having a keyboard locking function so that a change of direction of the laser beam cannot be brought about unintentionally by chance contact with the button for inputting the said control command.

10. An arrangement as claimed in claim 3, in which, in addition to the button for inputting the control command which triggers the control signal for the canal building laser device, a further button is provided for adjusting the approximate distance between the canal building laser device and the laser beam receiver.

* * * * *